Figure 17:
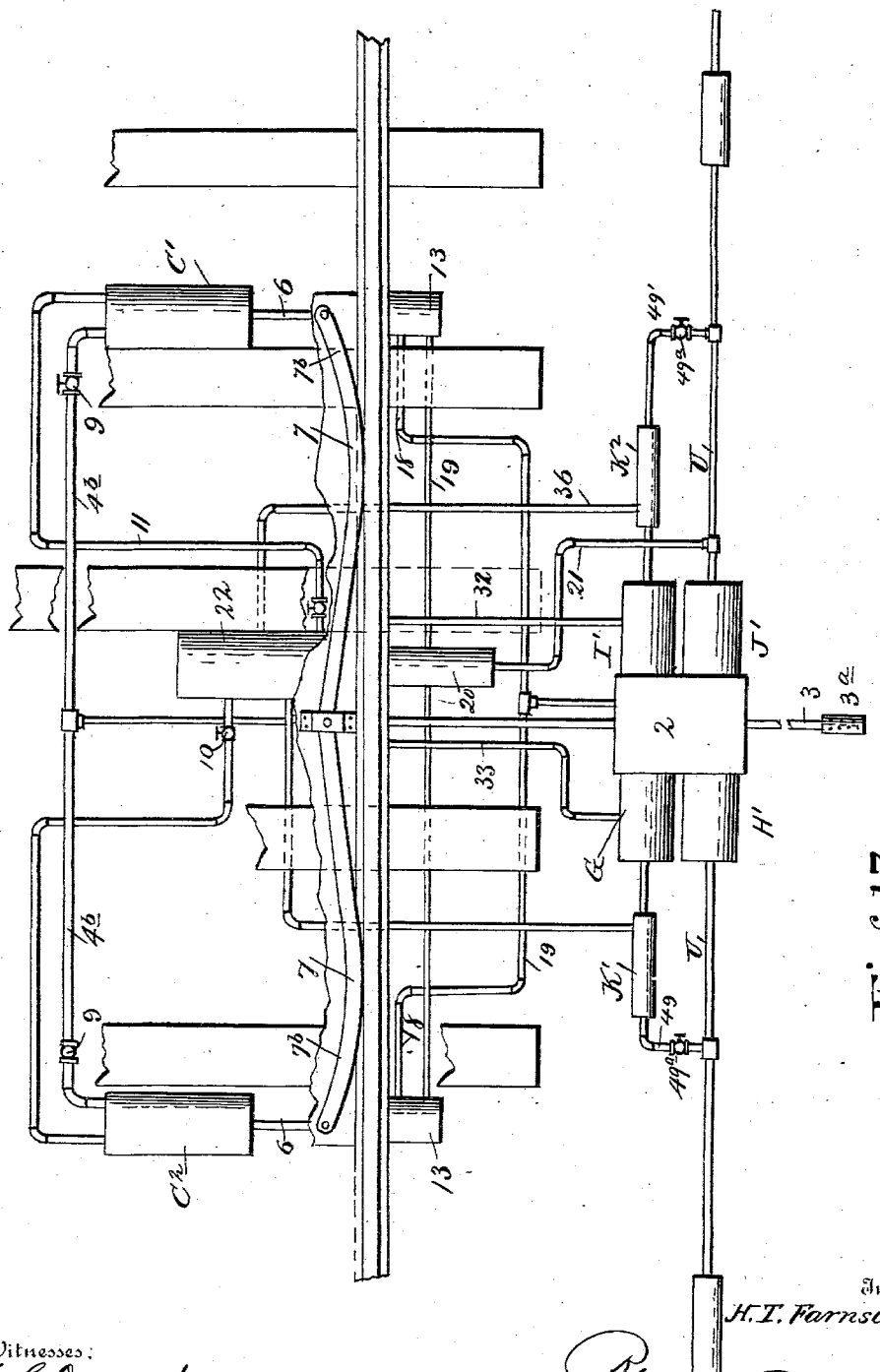

No. 739,660. PATENTED SEPT. 22, 1903.
H. T. FARNSWORTH.
PNEUMATIC SIGNAL SYSTEM.
APPLICATION FILED JAN. 8, 1903.
NO MODEL. 6 SHEETS—SHEET 1.
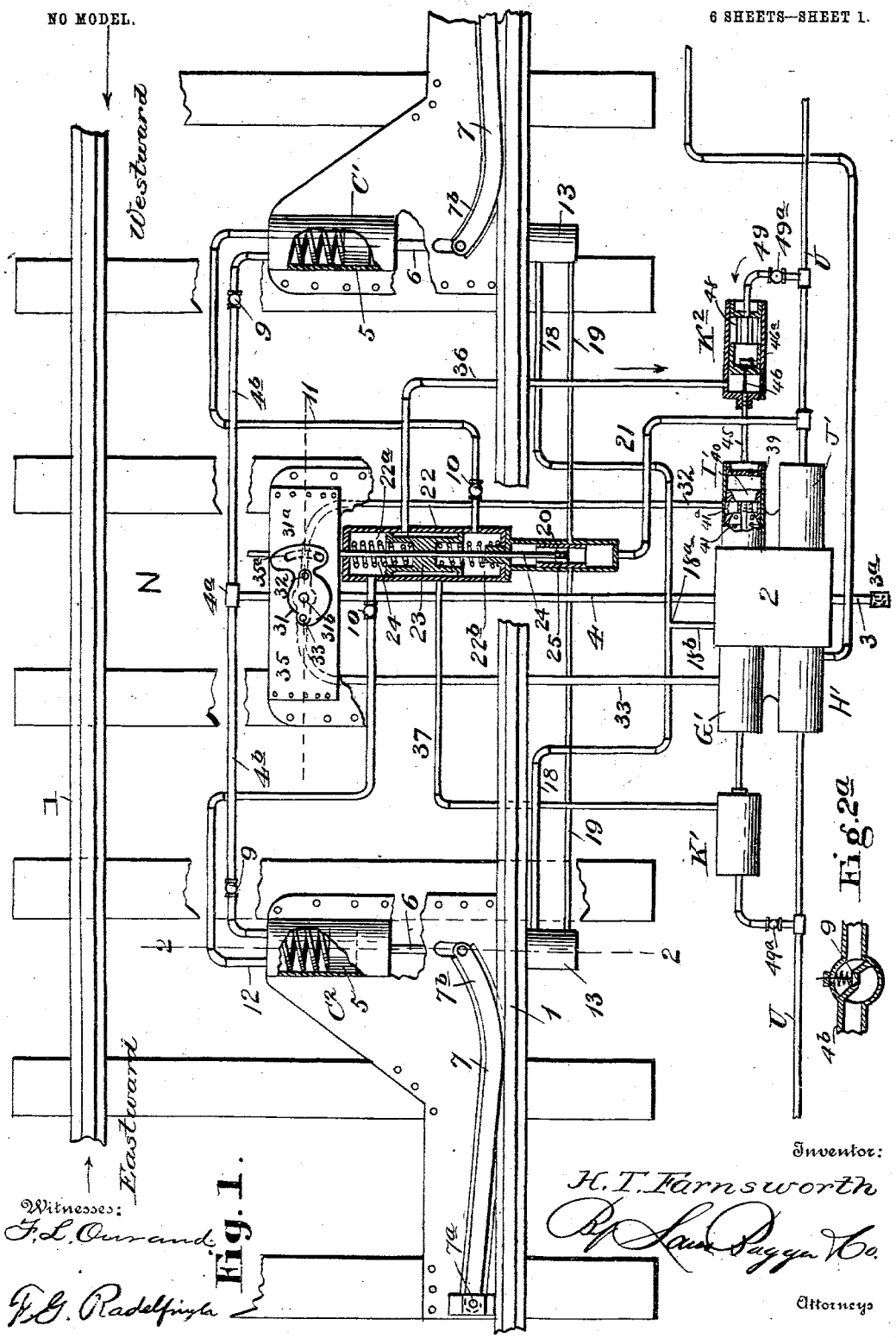

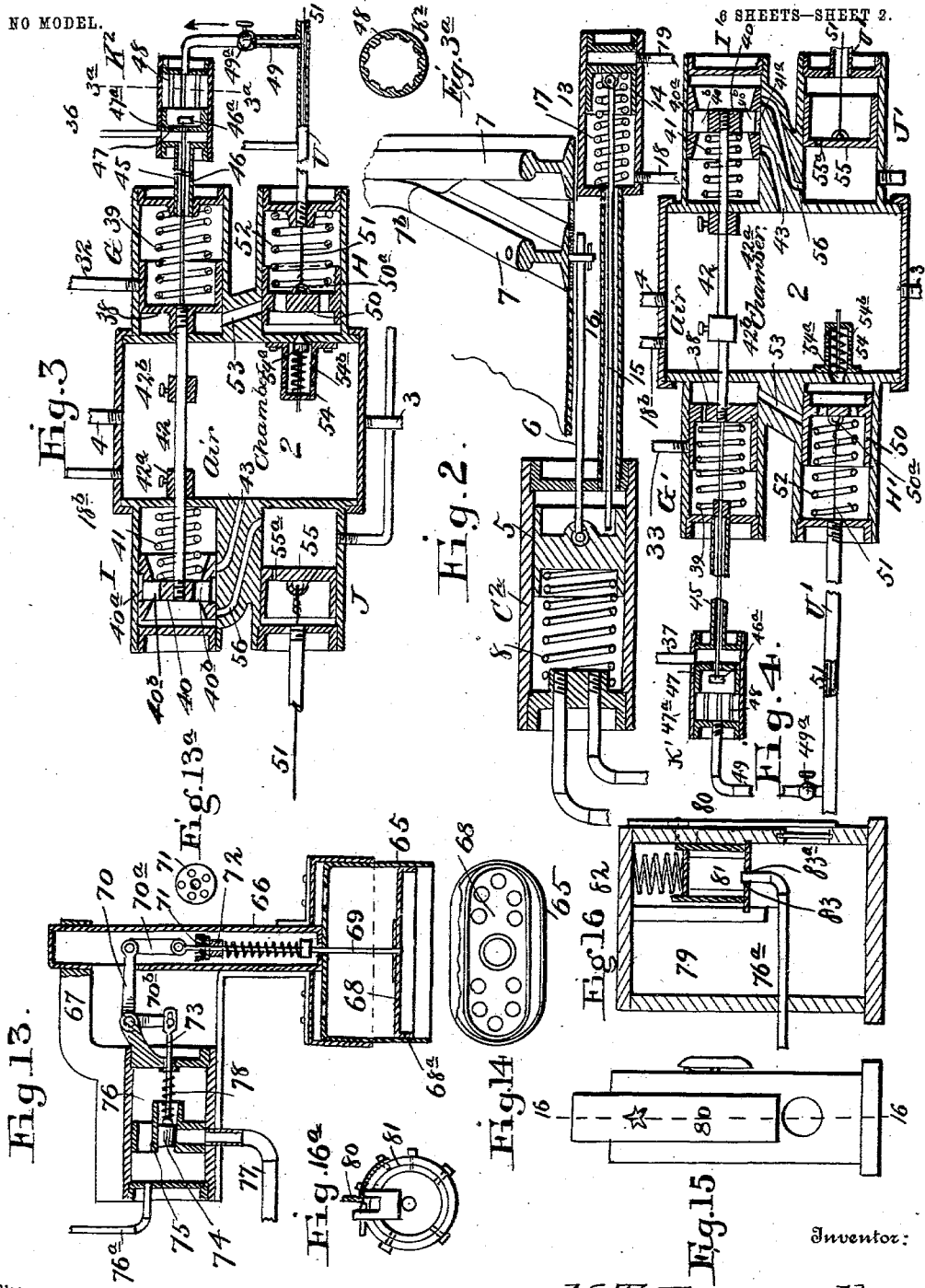

No. 739,660. PATENTED SEPT. 22, 1903.
H. T. FARNSWORTH.
PNEUMATIC SIGNAL SYSTEM.
APPLICATION FILED JAN. 8, 1903.
NO MODEL. 6 SHEETS—SHEET 3.
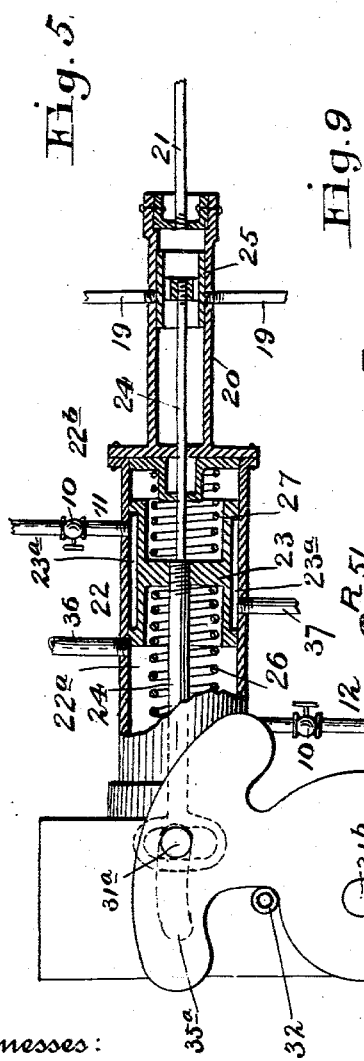
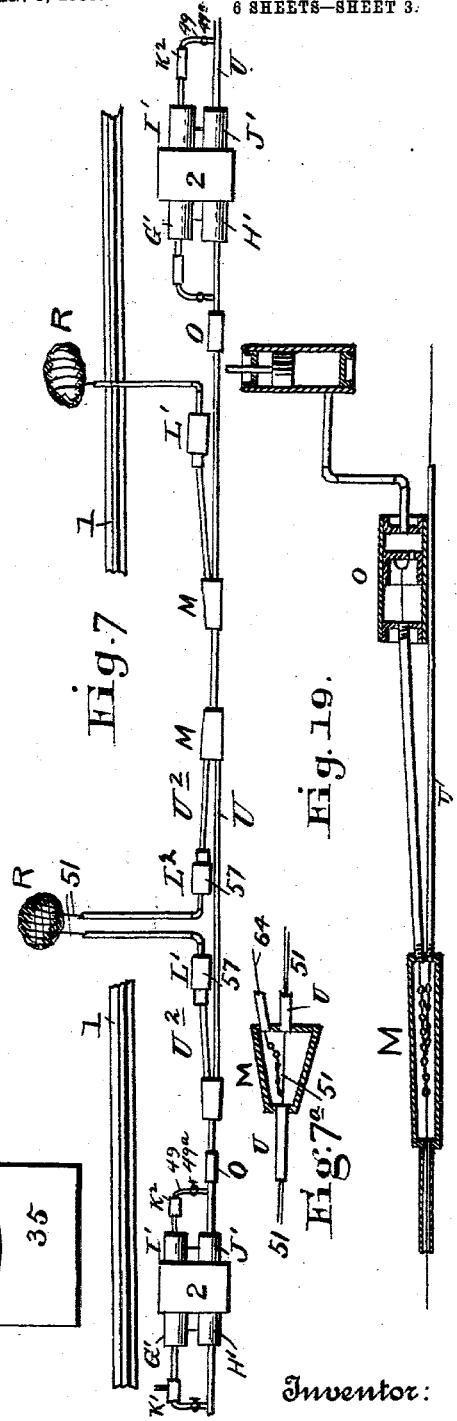
Witnesses:
F. L. Ourand
Frank G. Radelfinger
Inventor:
H. T. Farnsworth
by Louis Bagger & Co.,
Attorneys.

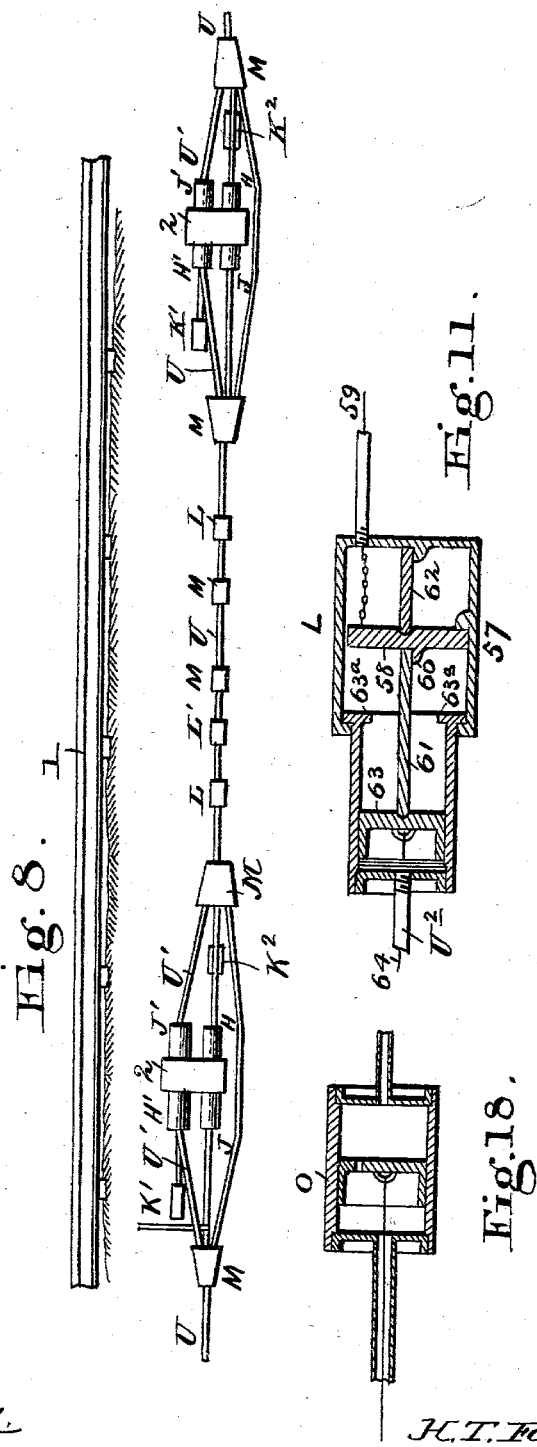

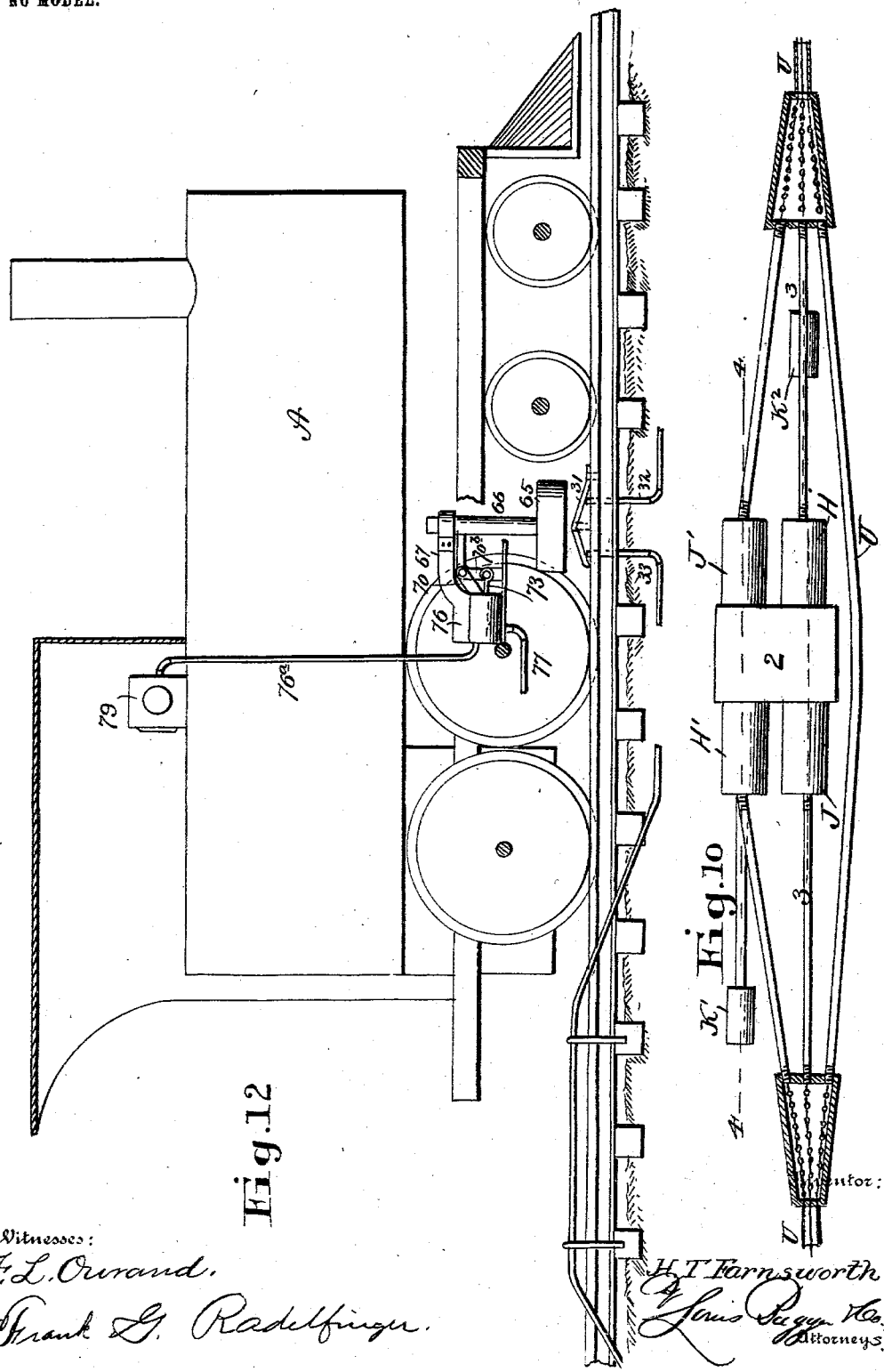

No. 739,660. PATENTED SEPT. 22, 1903.
H. T. FARNSWORTH.
PNEUMATIC SIGNAL SYSTEM.
APPLICATION FILED JAN. 8, 1903.
NO MODEL. 6 SHEETS—SHEET 6.

Witnesses:
F. L. Ourand
Frank G. Ridelfinger.

Inventor:
H. T. Farnsworth,
By Louis Bagger & Co.
Attorneys

No. 739,660. Patented September 22, 1903.

UNITED STATES PATENT OFFICE.

HENRY T. FARNSWORTH, OF GLADE SPRING, VIRGINIA, ASSIGNOR OF ONE-HALF TO GEORGE N. WERTZ, OF ABINGDON, VIRGINIA.

PNEUMATIC SIGNAL SYSTEM.

SPECIFICATION forming part of Letters Patent No. 739,660, dated September 22, 1903.

Application filed January 8, 1903. Serial No. 138,278. (No model.)

*To all whom it may concern:*

Be it known that I, HENRY T. FARNSWORTH, a citizen of the United States, residing at Glade Spring, in the county of Washington and State of Virginia, have invented new and useful Improvements in Pneumatic Signal Systems, of which the following is a specification.

My invention relates to pneumatic danger and block signals for railroads.

The first object of my device is to construct a device of this character which will enable trains to be informed when they are near another train on the same track.

The second object is to enable the knowledge of the occurrence of a threatened disaster or probable disaster—such as the washing away of a bridge, culvert, or the occurrence of a threatened landslide—to be communicated to the engineers of passing trains.

The third object is an improved receiving mechanism carried by the locomotive for receiving a signal designated by the blast of an uncovered nozzle or twyer.

The simple and novel construction employed by me in carrying out my invention is fully described and claimed in this specification and illustrated in the accompanying drawings, forming a part thereof, in which—

Figure 1, Sheet 1, is a plan view of one of my nests, with parts shown in section, which nest comprises an air-compression mechanism operated by the wheels of a passing train, twyers and means for covering them, which means is operated by the compressed air generated by said mechanism, and means for controlling the transmission of signals from said nest to the next one on either side, east or west. Fig. 2, Sheet 2, is a section on the line 2 2, Fig. 1, which defines a vertical plane through one of the compression-cylinders. Fig. 2ª is a detail of one of the check-valves. Fig. 3, Sheet 2, is a horizontal section through the bottom series of cylinders on the free-air box on the line 3 3, Fig. 10. Fig. 3ª, Sheet 2, is a detail section on the line 3ª 3ª, Fig. 3. Fig. 4, Sheet 2, is a horizontal section through the top series of cylinders on the free-air box on the line 4 4, Fig. 10. Fig. 5, Sheet 3, is a combined plan and section of the twyers, hood, and the cylinder for operating the same. Fig. 6, Sheet 4, is a vertical section through the hood and twyers. Fig. 7, Sheet 3, is a plan view of a section of the system comprising two free-air boxes and the connecting pipe-line. Fig. 7ª, Sheet 3, is a detail plan of a diverge-joint. Fig. 8, Sheet 4, is a side elevation of the section of the system shown in Fig. 7 in plan. Fig. 9, Sheet 3, is a detail of one of the branches connected to an obstacle. Fig. 10, Sheet 5, is a front elevation of one of the free-air boxes with connected cylinders and pipes. Fig. 11, Sheet 4, is a longitudinal section of one of the alarm-traps for connecting unstable objects lying near the track to my signal system. Fig. 12, Sheet 5, is a side elevation of a locomotive with parts broken away. Fig. 13, Sheet 2, is a vertical section through the hood carried by the locomotive. Fig. 13ª, Sheet 2, is a detail of the perforated piston in the hood-pipe. Fig. 14, Sheet 2, is a bottom plan of the hood with piston removed. Fig. 15, Sheet 2, is a side elevation of the signal-box. Fig. 16, Sheet 2, is a vertical section of the signal-box. Fig. 16ª, Sheet 2, is a detail of the connection between the box and the cylinder. Fig. 17, Sheet 6, is a plan view of the nest with modified pumping-lever mechanism. Fig. 18, Sheet 4, is a longitudinal section of a modified form of alarm-trap for use instead of L' and L². Fig. 19, Sheet 3, is a longitudinal section of a branch equipped with the trap O.

Like numerals and characters of reference designate like parts in the different views of the drawings.

The numeral 1 designates a railroad-track which is part of the main line, and mounted adjacent to this track is an air-chamber 2, which communicates with the open air by means of a pipe 3, provided with a strainer 3ª to prevent the entrance of dust. The end of this pipe may be located anywhere where communication with the open air may be had, and dust will not choke it.

A pipe 4 communicates with the chamber 2 and branches at 4ª, forming arms 4ᵇ, which connect with two compression-cylinders C' and C², located to the east and west, respectively, of the air-chamber 2. Snugly fitted in each of the compression-cylinders is a sliding piston 5, which is connected to a piston-rod 6, the outer end of which is pivotally connected to the free end of a pumping-lever 7, fulcrumed at its opposite end on a pin 7ª, located adjacent to one of the rails of the track 1. The lever 7 is curved at 7ᵇ to adapt it to be engaged and operated in one direction by the wheels of a passing train. A spring 8 bears on the piston 5 and on the upper head of the cylinder and serves to operate the lever 7 in the opposite direction. By this arrangement the piston 5 is reciprocated. A check-valve 9 is mounted in each of the branches 4ª and prevents the flow of air from the cylinders C' and C² into the chamber 2, while a valve 10, mounted in each of two pipes 11 and 12, connected to the upper heads of the cylinder C' and C², respectively, prevents the return of air to the cylinders C' and C² after having been forced out by the upward movement of the piston 5.

Cylinders 13 are mounted in alinement with the cylinders C' and C², and each of these cylinders 13 has a piston 14 mounted therein, which carries a stem 15, which extends through a pipe 16, connecting the cylinder 13 with the compression-cylinder. This stem 15 serves as a stop to limit the forward movement of the piston 5. A spring 17 bears on the piston 14 and normally holds the piston in the rear end of the cylinder 13 and withdraws the stem 15 from the cylinder C' or C² far enough to permit the lever 7 to come close enough to the track to be engaged by the wheels of the train. When, however, the piston 14 is in the forward end of the cylinder 13, the stem 15 will so limit the travel of the piston 5 that the lever 7 will clear the flange of the passing train. To operate the piston 14 in opposition to the spring 17 to hold the levers 7 clear of the train, pipes 18 and 19 are connected to the cylinder 13. The pipes 18 are connected to the forward end of the cylinders 13 and unite at 18ª to form a T, the stem 18ᵇ of which connects with the free-air chamber 2, and therefore maintains atmospheric pressure in the forward chamber of each of the cylinders 13 and the rear chamber of each of the cylinders C' and C². The pipes 19 connect with the rear chamber of each of the cylinders 13 and are connected centrally to a cylinder 20, the rear end of which is in turn connected by a pipe 21 to a pipe-line U, which extends along the track throughout the whole length of the signal system.

The cylinder 20 is in alinement with and is coupled to a cylinder 22, which contains a circumferential grooved piston 23, fixed on a piston-rod 24, which extends into the cylinder 20 and is connected to a piston 25, mounted therein. The pipes 11 and 12 are connected to the cylinder 22. The pipe 11 establishes communication between the rear chamber of the cylinder C' and the forward chamber 22ᵇ of the cylinder 22, and the pipe 12 establishes communication between the rear chamber of the cylinder C² and the rear chamber 22ª of the cylinder 22. Springs 26 and 27 bear on the front and rear, respectively, of the piston 23 and hold it normally in the center of the cylinder 22 and covering the mouths of pipes 36 and 37, connected to the cylinder 22. When covered in this manner, the pipes 36 and 37 are in communication by way of the circumferential groove 23ª in the piston 23.

The outer end of the piston-rod 24 is pivoted to a pin 31ª, carried by a hood 31, pivoted on a vertical pin 31ᵇ, seated between two twyers 32 and 33. The hood 31 is set to normally cover both twyers and to cover twyer 32 and uncover twyer 33 when the piston 23 is in one extreme position and the reverse when the piston 23 is in its other extreme position. The movement of the hood 31 is limited by the pin 31ª, which engages a slot 35ª in a base-plate 35. Pipes 36 and 37 are also connected to the cylinder 22, opposite to the pipes 12 and 11, respectively.

By the arrangement just described the hood 31 is operated to cover and uncover the twyers 32 and 33 by the action of the compression-cylinders C' and C² in the following manner: The air drawn into the cylinders C' and C² from the chamber 2, through the pipes 4 and 4ᵇ, is compressed and forced out through the pipe 11 or 12. To fix ideas, suppose the train is going westward. Then it would pass over the cylinder C' first and the compressed air would pass out through pipe 11 into the cylinder 22, forcing the piston 23 into the front end thereof and operate the piston-rod 24 to rotate the hood 31 and uncover the twyer 33 to blow a blast to operate an alarm mechanism carried by the locomotive, as will appear. The piston 23 will have been operated, as above specified, before the train reaches the cylinder C² and engages its pumping-lever 7 to operate the piston 5 therein. The air compressed in the cylinder C² will pass out through the pipe 12, and since the piston 23 is now in the front end of the cylinder 22 the pipe 12 will communicate with the pipe 36 via the groove 23ª. When the train is going eastward, the piston 23 will be forced into the rear end of the cylinder 22 by the air from cylinder C² and the air from C' will pass out through pipe 37 and act on a mechanism to be described to transmit the signal to the next nest, the piston-rod 24 will be operated by the piston 23 to rotate the hood 31 to uncover the twyer 32 and cover the twyer 33.

It will be evident from what has been said that only one of the twyers 32 and 33 is uncovered at any time. Therefore a passing train can open but one of them. This is a very important point, as it effectively guards against mistakes. The means for connecting the mechanism just described to the system will now be described.

Connected to the free-air box 2 are eight cylinders H H', G G', I I', and J J'. The four cylinders H, G, I, and J are connected to the bottom of the box 2 in the same plane, while the cylinders H', G', I', and J' are connected to the top of the box 2 and disposed on opposite sides thereof from the similarly-lettered cylinders below. The mechanism in both sets of cylinders is identical, so that but one set will be described in detail and the same characters will be applied to both.

The cylinder G contains a perforated piston 38, and a spring 39 is located in the rear chamber and bears on the piston 38 to hold it normally covering the mouth of the twyer-pipe 32, which is connected thereto. The cylinder I is located in alinement with the cylinder G, is closed at its rear end to the atmosphere, and contains a piston 40, which has a circumferential groove $40^a$ and transverse apertures $40^b$ therein. A spring 41 bears on the rear of the piston 40, and a piston-rod 42 connects the pistons 38 and 40 and constrains them to move in unison. A passage 43 connects the cylinder I and the box 2. Collars $42^a$ and $42^b$, adjustably mounted on the rod 42, serve as stops to limit the movement of the pistons. An alarm-trap cylinder $K^2$ is connected to the rear head of the cylinder G by a pipe 45, which contains a wire 46, which is connected to the piston 38 and bears a head $46^a$, which engages an aperture $47^a$ in a piston 47, contained in the cylinder $K^2$, and holds the piston in its normal position in the forward end of the cylinder $K^2$, which end it fits snugly; but the rear chamber is grooved at 48 to permit the passage of air around the piston 47 when it is moved into its rearmost position. The pipe 36 connects with the forward chamber of the cylinder $K^2$, and a pipe 49 with the rear chamber thereof, which pipe is also connected to the main air-pipe U. A check-valve $49^a$ is mounted in the pipe 49 to prevent the flow of air from the main pipe U into the cylinder $K^2$.

The cylinder H contains an apertured piston 50, bearing a staple $50^a$, to which a wire 51 is secured, which is contained in the east section of the main-line pipe U. The other end of the wire 51 is connected to the piston in the cylinder J of the next station east, at which there is a nest similar to the one shown in Fig. 1. A spring 52 bears on the piston 50 and holds it in its normal position, covering a port 53, establishing communication between the forward chambers of the cylinders G and H. A safety-valve 54 is mounted in a perforated casing and seated in an aperture $54^a$ in the inner head of the cylinder H. A spring $54^b$ bears on the valve and is adjusted to retain the normal pressure in the cylinder of the pipe-line U.

The cylinder J contains a piston 55, having a small perforation $55^a$ therein. The piston 55 is provided with a staple, to which is connected a wire 51, which is mounted in the west section of the pipe-line U. The other end of the wire 51 is connected to the piston 50 in the cylinder H of the next nest N to the west, as described above. The front chamber of the cylinder J is connected by a passage 56 to the rear chamber of the cylinder I. The passage 56 is, as is also the passage 43, normally covered by the piston 40. The perforation $55^a$ enables the pressure in the two ends of the cylinder J to equalize after the lapse of an interval of time sufficient to send a signal.

As before stated, the corresponding cylinders G' H' I' J' are located above and disposed oppositely to the cylinders just described. The twyer-pipe 33 is connected to the cylinder G', and branches U' of the main line connect to the cylinders H' J', which branches are connected to the main line and to one of the wires 51 by diverge-joints M, as shown in Fig. 8. There are two wires 51 in each of the pipes U, one for signals east, the other for west. The alarm-trap K' is identical in construction to the trap $K^2$ and is connected to the pipe 37.

The nests N are located at intervals of about half a mile along the track and are connected by the sections U of the main pipe-line, which is broken at every free-air box 2. The main-line pipe U is kept charged up to a pressure of about thirty pounds by the exhaust-air from the cylinder K' and $K^2$, which passes into the pipe U by way of the pipe 49 and check-valves $49^a$. The pressure is kept down by means of the safety-valve 54.

In order to give a signal when an obstacle falls on the track, branches $U^2$ are formed on the pipes U intermediate the nest N, which branches are each connected to an alarm-trap L'. The mechanism of each of the traps L' is contained in a cylinder 57, containing a trigger-bar 58, the upper end of which is connected to a wire 59, which is designed to be attached to some mass which occupies a position of unstable equilibrium at the side of the track and is likely to fall thereon or a bridge threatened by high water. The lower end of the trigger rests against a lug 60, which serves as a stop. A brace 61 bears against the center of the trigger 58 and a brace 62 bears on the other side of the trigger 58 oppositely the brace 61 and is footed on the piston 63, which is slidingly mounted in the cylinder 57 and is connected to a wire 64, which extends through the branch pipe $U^2$ and connects with the proper wire 51 in the in the main line U at a diverge joint M.

If the mass R should slide on the track, it would exert a pull on the wire 59, which would topple over the trigger 58, displace the braces 61 and 62, and release the piston 63 and permit the pressure in the main pipe U to operate thereon and move it until it comes in contact with stops $63^a$, mounted within the cylinder. This movement of the piston 63 will actuate the wire 64, which will in turn operate the wire 51 in the pipe U, which would move the piston 50, since it is apertured, which will uncover the port 53, permitting air to flow into the cylinder G, thereby displacing the piston 38 to the right and uncovering the twyer-pipe 32 and allowing the air to enter, so that when the next train comes along and opens the twyer 32 a blast of air will issue and operate the signal thereon. The moving of the piston 38 will simultaneously operate the piston 40 to uncover the port 56 and allow the escape of air from the forward chamber of the cylinder J, distributing the equilibrium, which will cause the pressure in the pipe U to move the piston 55 to the right and pull the wire 51 to displace the piston 50 in the next cylinder H to the westward, and so on throughout the westward extent of the system. In order that the news of the obstruction may be transmitted eastward as well as westward, it is necessary to have a second trap $L^2$, which is connected by an oppositely-extending diverge joint N to the other wire 51 in the line U, which wire is connected to the upper set of cylinders H' J' on the free-air box 2.

In order that a signal may be received by the locomotive-engineer corresponding to blasts from the uncovered twyers 32 and 33, the locomotive is equipped with a device which is constructed as follows: A locomotive A of standard construction carries a hood 65, which is open at the bottom and closed at the top and is supported by a vertical hollow pipe 66, which is in turn supported by an arm 67, secured to the frame of the locomotive adjacent to the front drive-wheels and intermediate the same. A piston 68, bearing a rim $68^a$, fits loosely within the hood 65 and is connected to a stem 69, which extends up through the hollow pipe 66 and is pivoted to the long arm $70^a$ of an elbow-lever 70. A perforated piston 71 is also carried by the stem 69, and in combination with a spring-pressed collar 72, slidingly mounted on the stem, forms a valve which prevents the passage of air up through the pipe 66, but permits the downward flow of air into the hood 65 above the piston 68 to restore it to its initial position after being raised. The short arm $70^b$ of the elbow-lever 70 is connected to the stem 73 of a frusto-conical valve 74, mounted in an aperture in a partition 75 in a tight cylinder 76 and located to normally close the end of a pipe 77, which communicates with a supply or source of compressed air carried by the locomotive. A spring 78 bears on the valve 74 and holds it in its normal position. A pipe $76^a$ is connected to the cylinder 76 and to a signal-box 79, designed to accommodate a lamp. (Not shown.) A shutter 80 is slidingly mounted in said box 79 and is arranged to eclipse the rays of light issuing from said lamp. Colored glasses may be used, if desired. A cylinder 81 is rigidly connected to the shutter 80, which cylinder is closed at its upper end and open at its lower. A spring 82 bears on the upper end of the cylinder 81 and holds it normally in contact with a shelf 83, which is apertured at $83^a$ to accommodate the end of the pipe $76^a$. By virtue of this arrangement when air is admitted into the pipe $76^a$ the cylinder 81 is raised and the shutter operated to uncover the lamp or to operate any kind of a signal, such as blow a whistle or ring a bell. As will be readily understood, it is easily seen that air will flow into the pipe $76^a$ whenever the piston 68 in the hood 65 is raised, since this action would operate the lever 70 to move the valve 78 to uncover the mouth of the pipe 77 which is supplied with compressed air. The piston 68 will be raised every time the hood 65 passes over an open twyer to which a blast of air has been sent by a passing train or the moving of tethered object R. The operating of the shutter 80 in the signal-box 79 will therefore warn the engineer and put him on his inquiry. The complete operation of my device can now be briefly sketched.

We will suppose that there are at least three nests N in the system and several alarm-traps L' $L^2$, located intermediate said nests and connected to impending slides or bridges R. Suppose now that R should slide onto the track, thereby giving a tug on the wire 59 connected thereto, which, as before explained, would displace the trigger 58 and release the piston 63, which would then be moved by the pressure in the pipe $U^2$ and U until it engages the stops $63^a$. This movement of the piston 63 will be communicated by the wires 64 and 51 to the perforated piston 50 in the cylinder H. Since the air-pressure is equal on both sides of it, only the pressure of the spring 52 has to be overcome. This will uncover the port 53 and allow air from the pipe U to flow into the forward end of the cylinder G and force the piston 38 into the outer right end of the cylinder G and open the twyer-pipe 32 and permit the air to enter it. Simultaneously with the movement of the piston 38 to the right the piston 40 in the cylinder I will move to the right, since the two are connected. This would uncover the ports 56 and 43 and release the air in the right-hand end of the cylinder J and permit the pressure in the pipe U, connected to the cylinder J, to force the piston 55 therein to the right, which action would draw the wire 51 in the pipe U to the right and also the piston 50 in the cylinder H of the next nest N to the westward and open the twyer 32 in this nest. In this manner all of the twyers 32 to the west of the alarm-trap L' set off will be charged with air under pressure. In order to transmit the same signal east, it is only necessary to have a second wire 64 connected to the piston 63 and branching to the east and connected to the other wire 51 in the pipe U, or to have a trap $L^2$ connected to the same object R, as shown in Fig. 7. This trap $L^2$ would pull on the other wire 51 and operate the cylinders G' H' I' J' in the same manner as the cylinders G, H, I, and J are operated, as just described, which would open all of the twyers 33 to the east of slide R. We would now have all of the twyers 32 to the west of the obstruction R charged and all of the twyers 33 to the east of the same charged.

Therefore a train entering the west end of block on which my system is installed would as it proceeded east and passed over the nests N operate the cylinders C² to actuate the piston 23 and operate the hood 31 to uncover the charged twyers 32, while a train entering the east end of the block would open the charged twyers 33.

A train on opening a charged twyer would receive a signal operated by the blast as follows: The blast from the twyer would raise the piston 68 in the hood 65 and actuate the lever 70 to operate the valve 74 to uncover the air-pipe 77 and release the compressed air therein, which would pass out through the pipe 76ª and into the signal-box 79, raise the cylinder 81 and simultaneously the shutter 80, thereby exposing the signal-light. As soon as the hood 65 clears the twyers the piston 68 would fall and discontinue the signal.

The manner in which my system operates to warn trains of each other's proximity will now be described. A train going east in passing over a nest N would first reach the cylinder C² and the wheels would engage the lever 7 to operate it to compress air, which would force the piston 23 into the rear of the cylinder 22 and uncover the twyer 32. The moving of the piston 23 will move the piston 25 far enough to uncover the pipes 19 and permit air to flow from the cylinder 20, which air is at main-line U pressure, because of the connection 21 through the pipes 19 into the stop-cylinders 13, Fig. 2, thereby forcing the piston 14 and plunger 15 to the left and moving the pumping-levers 7 clear of the flanges of a passing train to prevent wear and tear on the machinery. As soon, however, as the pressure in the cylinder 22 falls below the normal the springs 26 and 27 will restore the piston 25 to its normal position, close the pipes 19, and permit the springs 17 in the cylinders 13 to retract the plungers 15 and allow the pumping-levers 7 to be again engaged by the wheels of a passing train. As soon as the cylinder 23 uncovers the mouth of the pipe 36 the air entering through the pipe 10 will flow into the cylinder K² and drive the piston 47 to the right. The moving of the piston 47 to the right also moves the piston 40 and opens the ports 56 and 43 to release the air in the right-hand end of the cylinder J and permit the air in the pipe U to operate it to send the signal to the west, as has been before described. By the time the train reaches the cylinder C' the cylinder 23 will be in the lower end of the cylinder 22, and the air from the cylinder C' will then flow through the pipes 11 and 37 into the cylinder K', which will operate similarly to the cylinder K² to transmit the signal to the eastward by charging the twyers 33. Trains opening these twyers will then reverse signals. It will be seen by this arrangement it is impossible for a train to receive the signal started by itself, as the twyers 32 and 33 are all located on opposite sides. It will also be seen that a signal will persist until equilibrium is restored between the ends of the cylinders J J', the pistons of which are perforated.

Having thus described my invention, what I claim as new, and desire to secure by Letters Patent, is—

1. In a pneumatic signaling device, the combination of two twyers located intermediate the rails of a railroad-track and connected to a source of compressed air, a hood or shutter mounted to be operated to cover or uncover said twyers, and means for operating said hood, said means being operated by the passing of a train, and a signal carried by said train and operated by a blast from one of said twyers, substantially as described.

2. In a pneumatic signaling device, the combination of an air-compression cylinder provided with air connections, a piston mounted in said cylinder, a pumping-lever connected to said piston and located to be engaged and moved in one direction by the wheels of a passing train, a spring located to operate said piston in the other direction, a twyer located intermediate the rails and connected to a supply of compressed air, a hood mounted to cover and uncover said twyer, a cylinder containing a piston connected to operate said hood, a pipe connecting said compression-cylinder and said last-mentioned cylinder to enable said hood to be operated by said passing train, substantially as described.

3. In a pneumatic signaling device, the combination of a compression-cylinder, a pipe connected to said compression-cylinder and provided with a check-valve to prevent the outflow of air, a piston mounted in said cylinder, a spring bearing on said piston, a pumping-lever located to be engaged by the wheels of a passing train, said lever being connected to said piston to operate it in opposition to said spring, a twyer located between said rails and connected to some source of air under pressure, a hood mounted adjacent to said twyer, a cylinder containing a piston connected to said hood, a spring bearing on said last-mentioned piston, and a pipe connecting said compression-cylinder and said cylinder, and a valve mounted in said last-mentioned pipe to prevent the outflow of air from said cylinder, substantially as described.

4. In a pneumatic signaling device, the combination of a compression-cylinder provided with air connections, a piston mounted in said cylinder, a spring bearing on said piston, a pumping-lever located to be operated by the wheels of a passing train, a rod connecting said lever and said piston, a cylinder mounted in alinement with said compression-cylinder and provided with air connections, a piston mounted in said last-mentioned cylinder and carrying a rod extending into said compression-cylinder to limit the movement of the piston therein to control the distance between said lever and the rail, a spring bearing on said last-mentioned piston, substantially as described.

5. In a pneumatic signaling system, the combination of a twyer located intermediate the rails of a track, a hood for said twyer, a cylinder, a piston mounted in said cylinder, a piston-rod connected to said hood to operate it to cover and uncover said twyer, springs mounted to bear on opposite sides of said piston, two air-pipes each connected to said cylinder on opposite sides of said piston, substantially as described.

6. In a pneumatic alarm mechanism, the combination of two twyers connected to a source of air under pressure and located intermediate the rails of a track, a hood mounted to cover and uncover said twyers, a cylinder, a piston mounted in said cylinder, springs bearing on opposite ends of said piston to hold it in a normal position intermediate its ends, a piston-rod connected to said piston and to said hood, two air-compression cylinders, two pipes each connected to one of said compression-cylinders and to said first-mentioned cylinder on opposite sides of the normal position of said piston therein, valves in said pipes, pumping-levers located to be operated by a passing train, pistons mounted in said compression-cylinders and connected to said pumping-levers, substantially as described.

7. In a pneumatic signaling device, the combination of a twyer located intermediate the rails of a track, and connected to a source of air under pressure, means operated by a passing train to cover and uncover said twyer, a signal carried by a locomotive and means carried by said locomotive to be operated by a blast from said twyer to display said signal to the engineer, substantially as described.

8. In a pneumatic signal system, the combination of a twyer mounted intermediate the rails of a track and connected to a source of air under pressure, a hood mounted to cover and uncover said twyer, means for operating said hood, said means being operated by a passing train, a hood mounted on a locomotive and containing a piston, constructed to be operated by a blast from said twyer, a signal, and means operated by said piston to display said signal, substantially as described.

9. In a pneumatic signaling device, the combination of a hood mounted on a locomotive, and disposed to catch an air-blast from a twyer located intermediate the rails of the track, a piston slidingly mounted in said hood, a signal carried by said locomotive, an air-pipe connected to some supply of compressed air carried by the locomotive, a valve mounted to control the outflow of air from said pipe, said valve being connected to be operated by the upward movement of said piston, and means operated by a blast from said air-pipe to display said signal, substantially as described.

10. In a pneumatic signaling device, the combination of a cylinder containing a piston, a main pipe-line extending along the track and connected to some source of air under pressure, a wire slidingly mounted in said pipe-line and connected to the rear of said piston, a trigger-bar mounted in said cylinder, brace-bars bearing on the front of said piston and the rear of said trigger-bar, a brace-bar bearing on the front of said trigger and the rear head of said cylinder, and means for connecting said trigger to a threatened slide, substantially as described.

11. In a pneumatic alarm system, a cylinder containing a piston having a minute perforation therein, a pipe-line supplied with air under pressure, a wire contained in said pipe-line and connected to said cylinder, a second cylinder containing an apertured piston, a spring bearing on said piston, and means for suddenly reducing the pressure in the rear chamber of said first-mentioned cylinder, substantially as described.

In testimony whereof I have hereunto set my hand in presence of two subscribing witnesses.

HENRY T. FARNSWORTH.

Witnesses:
M. M. MORRISS,
B. S. BROOKS.